United States Patent [19]

Stussi

[11] 4,318,935
[45] * Mar. 9, 1982

[54] PROCESS OF FILLING CONTAINERS WITH A BASE FOOD PRODUCT AND A TOPPING

[76] Inventor: William E. Stussi, 8508 Roanoke Rd., San Gabriel, Calif. 91775

[*] Notice: The portion of the term of this patent subsequent to Sep. 30, 1997, has been disclaimed.

[21] Appl. No.: 139,300

[22] Filed: Apr. 11, 1980

Related U.S. Application Data

[63] Continuation-in-part of Ser. No. 937,596, Aug. 28, 1978, Pat. No. 4,225,623, which is a continuation-in-part of Ser. No. 850,410, Nov. 10, 1977, abandoned.

[51] Int. Cl.³ .................. A23L 1/04; A23C 19/12; A23L 1/187; A23B 3/00
[52] U.S. Cl. .................... 426/576; 426/579; 426/582; 426/589; 426/393; 426/394
[58] Field of Search ............... 426/89, 100, 101, 102, 426/112, 565, 573, 576, 579, 582, 583, 589, 393, 394, 34

[56] References Cited

U.S. PATENT DOCUMENTS

| | | | |
|---|---|---|---|
| 2,005,245 | 6/1935 | Stover | 426/101 X |
| 2,486,194 | 10/1949 | Moser | 426/101 X |
| 4,058,630 | 11/1977 | Busnel | 426/394 |
| 4,190,676 | 2/1980 | Göringer et al. | 426/565 X |
| 4,225,623 | 9/1980 | Stussi | 426/583 |

*Primary Examiner*—David M. Naff
*Attorney, Agent, or Firm*—Christie, Parker & Hale

[57] ABSTRACT

Containers are filled with a topping and a base food product that supports the topping by introducing through the opening of an inverted container a layer of food product that is supported by the inside surface of a removable lid of the container, then filling the interior of the inverted container with a base food product that is solidifiable and is different from the food product layer, sealing the opening of the container, maintaining the container in the inverted position until the base food product is sufficiently solidified to self-support the food product layer and positioning the sealed container in the upright position for the base food product to self-support the food product layer above it is a topping beneath the removable lid.

24 Claims, 2 Drawing Figures

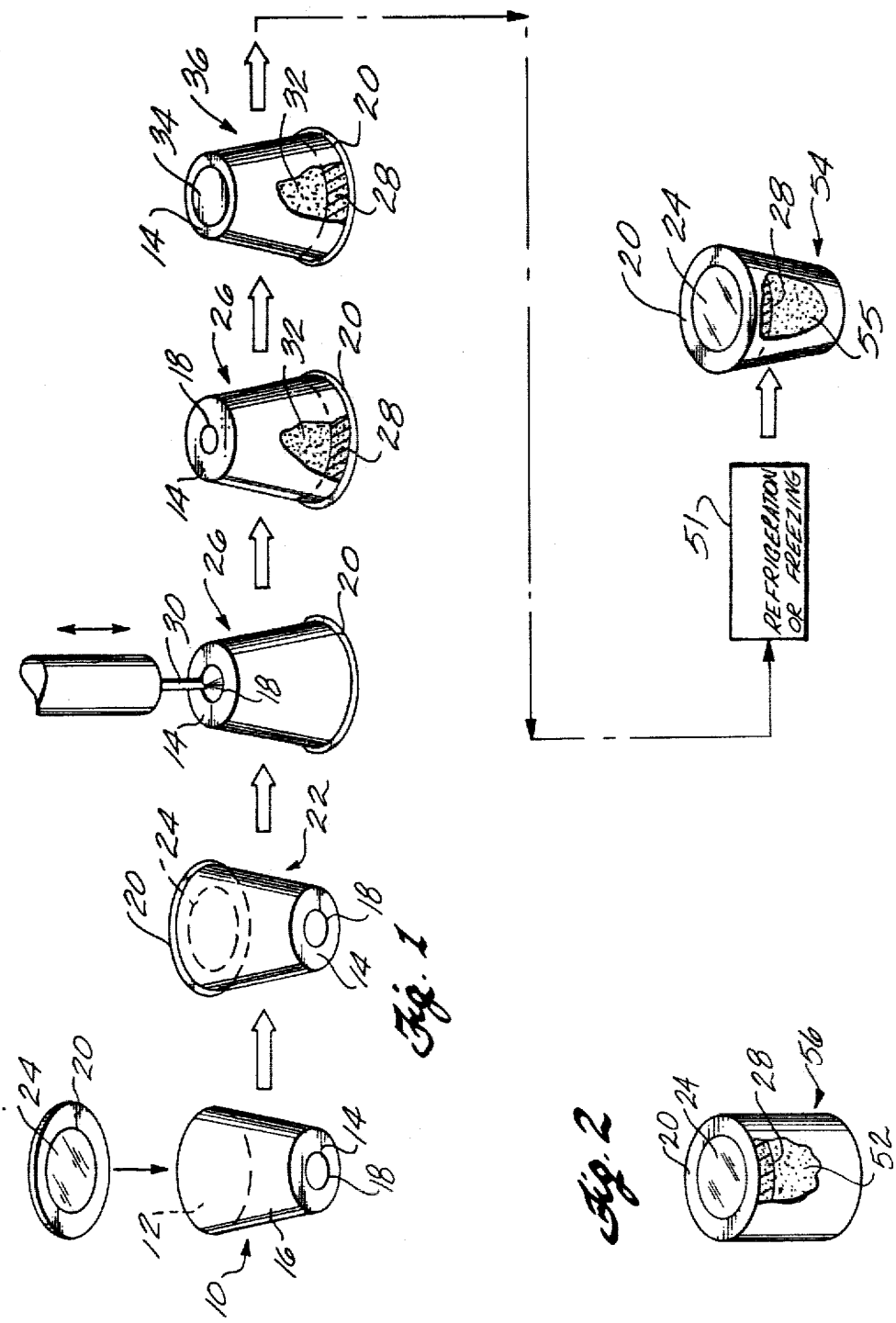

PROCESS OF FILLING CONTAINERS WITH A BASE FOOD PRODUCT AND A TOPPING

CROSS-REFERENCE TO RELATED APPLICATIONS

This is a continuation-in-part of application Ser. No. 937,596, filed Aug. 28, 1978, now U.S. Pat. No. 4,225,623, which, in turn, is a continuation-in-part of application Ser. No. 850,410, filed Nov. 10, 1977, now abandoned. These prior applications are incorporated herein by this reference.

FIELD OF THE INVENTION

This invention relates to a commercial method for filling containers with a base food product and a topping, in which the topping is formed as a layer self-supported by a base food product in the bottom of the container, and in which the topping is immediately inside a lid which closes the top of the container.

BACKGROUND

It would be desirable to commercially fill containers with base food products and toppings, where the topping is formed as a layer above the base food product which principally fills the container. In commercially filling containers with such composite food products, it is desirable to fill the container in a "single-pass" operation, i.e., in which the container is filled in a series of operations that are not interrupted for any undue length of time. In fact, food processing today is carried out in a "form, fill and seal" technique in which the container is formed from sheet stock material, the container is filled, and the filled container is sealed in one reasonably uninterrupted series of operations.

Certain food products have not been conducive to filling containers in a "single-pass" operation. Gellable food products, such as gelatin desserts and some cheeses and puddings, to name a few, require time for the product to gel set after it is placed in a container. Containers of these gellable food products have not, to my knowledge, been produced commercially with a separate layer or topping of another food product, especially with toppings having a higher specific gravity than the gellable base product. It is impractical from a commercial standpoint to partially fill a container with a gellable food product, and then apply a temporary lid or seal while the product gel-sets, after which the temporary lid or seal is removed and a topping is introduced to the container after the gel-set product has attained sufficient gel strength to support the topping. Such a "double-pass" process is not only too time consuming, but also presents a potential for contamination which can otherwise be avoided by a "single-pass" process. It is impractical from a commercial standpoint to fill containers with a gellable food product and attempt to place a topping on it before the base product gel sets, because in most cases it will not have the gel strength necessary to self-support the topping, especially a topping with a higher specific gravity. The topping will sink to the bottom of the container.

Hence, gellable food products with toppings are not common food items because the prior art has not provided a commercially practical method for filling containers with such products in a single-pass operation.

The food packaging industry has recognized the consumer's desire to be shown what they are buying; and this is accomplished by marketing food products in see-through containers, or at least in containers with a transparent see-through lid. Significantly, food products in containers with see-through lids are not visually attractive to the consumer if there is an air space or "head space" between the product and the inside of the see-through lid. However, it is difficult to conventionally fill a container with just the right amount of a food product and then place a lid on the container and have the product stay in contact with the lid, i.e., with no head space during prolonged storage.

Not only does the absence of head space make the food product more visually attractive through a see-through lid, but it also inhibits discoloration and flavor deterioration otherwise caused by oxygen in the air being entrapped between the product and the lid.

This invention overcomes the shortcomings of the prior art and provides a method for filling containers with a base food product and a topping in a single-pass operation, even though the topping may have a higher specific gravity than the base food product. The method facilitates maintaining the topping in constant contact with the inside surface of the lid, and therefore the product can have an attractive appearance to the consumer when packaged in a container with a see-through lid. Discoloration and flavor deterioration can also be inhibited.

SUMMARY OF THE INVENTION

This invention provides a commercial method for filling containers with a base food product that self-supports a topping located immediately inside a lid sealed to the top of the container. The topping may have a specific gravity greater than the base food product, or the topping may be a sauce-type topping. In either case, the base food product can self-support the topping so the topping is maintained in constant contact with the inside surface of the lid.

According to one method for carrying out the invention, one end of a container has a removable lid, and an opposite end of the container has an opening for providing access to the interior of the closed, empty container. The container is inverted so the lid is at the bottom of the closed container and the opening is foremost. The lid can have a transparent see-through window. A food product for providing a topping is introduced through the opening of the inverted container and formed as a layer resting on the inside surface of the lid. The remainder of the container is thereafter filled above said topping layer by a base food product introduced through the same opening of the inverted container. The base food product fills the interior of the inverted container above the layer formed as the topping. The specific gravity of the food product formed as the topping can be greater than the specific gravity of the base food product. The opening in the container is then sealed. The sealed container is re-positioned in the upright position, with the lid foremost, once the base product attains sufficient cohesive strength or supportive strength to self-support the topping.

In one form of the invention, the base food product can be a gellable material that gel-sets while the container is in the inverted position to attain the gel strength necessary to support the topping. The method is particularly useful in filling containers with a topping having a higher specific gravity than the base food product. Containers also can be filled with a base food product and a sauce-type topping. In this instance the sauce-type food product is introduced through the opening of the inverted container to form a layer resting on the inside surface of the lid. The remainder of the container is then filled with the base food product. The opening of the inverted container is sealed, and the contents of the container are frozen while maintaining the container in the inverted position. Upon subsequently positioning the container in the upright position with the lid foremost, the base food product can self-support the sauce-type layer as a topping above it, as long as the contents remain frozen. Subsequent heating of the contents, say in a microwave oven, can convert the topping to a liquid sauce that can drain under gravity and be dispersed throughout the base contents of the container.

According to either embodiment of this invention, the food product for forming the topping can be formed as a layer on the inside of the lid such that air adjacent the lid is displaced by the topping material. Subsequent filling of the container with the base food product self-supports the topping and maintains it in constant contact with the inside of the lid. A partial vacuum can be formed between the topping and the inside of the lid, which, in effect, adheres the topping to the lid, even during prolonged storage. Thus, the method facilitates use with transparent see-through lids since the topping being maintained in constant contact with the lid provides an effective means for consumers being able to view the contents of the container. Displacement of the air adjacent the lid also can inhibit discoloration and flavor deterioration of the contents.

These and other aspects of the invention will be more fully understood by referring to the following detailed description and accompanying drawings.

DRAWINGS

FIG. 1 is a schematic diagram illustrating a process for filling containers with a base food product and a topping according to principles of this invention; and FIG. 2 is a schematic perspective view, partially in cross-section and partially broken away, showing an alternative container that can be used in the process illustrated in FIG. 1.

DETAILED DESCRIPTION

FIG. 1 illustrates a "single-pass" process for filling containers with a base food product that self-supports a topping immediately inside the lid which closes the top of the container. The process of FIG. 1 is practiced with an empty container 10 having an open top 12, a bottom wall 14, a side wall 16 which tapers wider toward the top of the container, and a circular opening 18 formed in the bottom wall of the container.

As an alternative to the circular opening 18, the process of FIG. 1 can be practiced with a container having an X-shaped region, or other similarly shaped region, formed in a bottom wall of the container. The X-shaped region can be a cut, a perforation, a score line, or a weakened area preferably located in the center of the container bottom wall.

Referring again to FIG. 1, a removable lid 20 is sealed to the empty, upright container to provide a closed, empty container 22. The removable lid 20 is preferably the type having a see-through, transparent region 24, preferably in its center, as shown in FIG. 1, or a totally transparent plastic lid. The lid also preferably has a flat inside surface facing the interior of the container. The opening 18 provides a means for access to the interior of the closed, empty container 22. The closed, empty container 22 thus has a removable lid with a flat inside surface at one end of the container, and an opening in an opposite end of the container spaced from the removable lid.

The closed, empty container is then inverted to facilitate filling the container through the opening. The closed, empty container can be inverted by running it through a twisted track or tunnel (not shown) to flip the container 180° so the inside of the transparent lid 20 provides a horizontal floor of the closed, empty container. The container is shown in its inverted position at 26 with the opening 18 being foremost, i.e., at the top of the inverted container and spaced from the removable lid.

The invention is particularly useful in commercially filling containers with composite food products in which a primary or base food product in the bottom of the container self-supports a topping of a flavoring material formed as a layer above it. A layer 28 of flavoring material, hereinafter referred to as a topping, is placed on the inside surface of the lid of the inverted container by access provided by the opening 18. The topping is deposited in a layer of generally uniform thickness in the bottom of the inverted container. The topping can be a layer of fruit preserves, fruit cocktail, fruit pieces, such as glaced fruit pieces, pudding, sauces, nuts and combinations of these ingredients.

The topping material is deposited in a uniform layer on the inside surface of the lid. The topping layer can be deposited under pressure by a conventional filling nozzle or probe 30. The nozzle is held in a fixed position above the opening 18 in the bottom of the container, and the topping material is injected as a spray or blast under pressure through the opening in the container bottom wall to deposit the topping as a layer on the inside surface of the lid.

Alternatively, the nozzle can be a conventional air-actuated reciprocal filling nozzle. Such a nozzle can be reciprocally forced down through the opening 18 or through an X-shaped region of the container, as described above, so the probe can momentarily extend into the interior of the container for depositing the topping material on the inside surface of the lid. In the instance where the X-shaped region comprises a previously cut X-shaped opening, the nozzle in its downward movement can pierce through the X-shaped opening to gain access to the interior of the container for depositing the topping. Alternatively, the X-shaped region can be a weakened area or score line, and the remote end of the nozzle can be formed as a puncturing device. In its downward movement such a nozzle can puncture an X-shaped opening in the container bottom by punching down on the score line or weakened area in the container bottom.

The inverted container 26 then passes to a station for filling the remainder of the container with the base food product. The base food product is a type which can be introduced to the container through the opening 18 to fill the inverted container above the topping layer without commingling with, or otherwise diluting or disrupting the topping as a separate layer of reasonably uniform thickness. The invention is particularly useful with toppings and base food products introduced to the container in liquid or flowable form, in which the specific gravity of the topping, or at least a portion of the topping, is greater than, or at least about the same as the specific gravity of the base food product. In one particularly useful form of the invention, the base food product comprises a gellable material that is introduced to the interior of the inverted container as a liquid before it gel sets. In this instance, the gellable material can have a specific gravity less than the specific gravity of the topping material. Examples of such gellable base food products are flavored gelatins, puddings and cheeses. The base food product fraction can include one or more stabilizing agents that cause the liquid material to gel-set or solidify, say upon subsequent refrigeration or standing at room temperature.

A standard filler nozzle held in a fixed position above the opening 18 can be used to inject the base food product through the opening and into the container interior above the topping layer. Alternatively, a standard conventional air-actuated reciprocating filling nozzle or probe similar to the nozzle 30 can be used to inject the base food material through the opening to fill the remainder of the container.

The base food product preferably is in direct contact with the layer of topping material when the base material fills the container. The base material normally occupies about 80 percent of the volume of the container, with the balance being the topping material. The topping material remains as a layer of essentially uniform thickness on the inside of the lid while supporting the base product fraction above it.

Subsequent to filling the inverted container with the topping fraction 28 and the base product fraction 32, the individual containers continue along a conveyor to a station for automatically placing a seal 34 over the upwardly facing opening 18 in the container bottom for providing a liquid and air-tight seal over the opening. Preferably, the seal is made from a plastic material that can be heat-sealed to the container bottom surrounding the opening. Alternatively, the seal can be provided by a plug, not shown, having a body which is slightly oversized to make a tight friction fit in the container opening. The plug can have an outer flange or lip that overlies the upwardly facing exterior surface of the container bottom wall after the body of the plug is inserted in the opening. The overlying flange and oversized body of the plug cooperate to inhibit leakage through the opening. As a further alternative, a food-grade permanent adhesive-backed, pressure-sensitive label or seal, not shown, can be adhesively secured or bonded to the container bottom wall to seal either the opening 18 or any X-shaped cut in the bottom of the container. The seal or plug seals in the contents of the container throughout the remaining processing steps, as well as during shipping, distribution and consumer use. Such a sealed container is shown in its inverted position at 36.

Other forms of containers can be used with the method of this invention, and examples of such alternative containers are illustrated in my co-pending application Ser. No. 937,596, referenced above. Such alternative containers can include a hollow-stemmed, goblet-shaped plastic cup, or a container having a completely open bottom facing upwardly when the container is inverted. In the latter instance, the container is filled, after which the upwardly facing opening is sealed by bonding a flat bottom wall or disc over the opening. The container can be sealed by placing a disc over the container bottom and bonding the disc, say by heat-sealing it, to the side wall of the container. As a further alternative, the bottom opening can be closed by a cap which makes a friction fit with the side wall of the container.

Following the sealing step, the container is maintained in the inverted position, if necessary, until the base material attains a sufficient cohesive strength to self-support the layer of topping material when the container is re-positioned in the right-side-up position. In the embodiment in which the base food product is a gellable substance, the container is held in the inverted position until the gellable material gel-sets.

In some instances, the gellable material will require holding time in a refrigerator 51 to solidify or produce a gel-set. Refrigeration can be required to solidify any soluble gel stabilizers present, or to speed up the gelling or solidification process. The containers remain in their inverted position during such refrigeration. In some instances, gelable materials can gel-set while standing at room temperature. The process results in a base food product 52 capable of self-supporting the layer of topping material 28, even though the topping may have a higher specific gravity than the base product.

Following the refrigeration step, or at least once the base food product has attained the required level of cohesive strength or supportive strength, the containers are re-inverted to their normal upright position, with the lid foremost, as shown at 54, to provide a container in which the base food product is on the bottom of the container and a layer of topping material 28 is on top of the base material immediately inside the removable transparent lid.

The method makes it possible to fill containers commercially with a base food product having a topping formed as a separate uniform layer, even though the specific gravity of the topping is greater than the base material. The method is particularly useful where the base material is a gellable material, such as a flavored gelatin dessert, pudding, or certain types of cheeses. In these instances, the less dense gellable base material can be introduced into the inverted container as a liquid and allowed to gel set or coagulate above the more dense layer of topping material while the container is inverted. Once the gellable material has attained a gel strength sufficient to self-support the topping, the container can be re-inverted to the upright or right-side-up position, where the topping is displayed through the see-through window.

The invention can also be used to commercially fill containers with other base food products that can be introduced to the container in a liquid state and then undergo solidification in the inverted container, so that upon subsequently re-inverting the container to the upright position, the solidified base material self-supports a topping in layer form immediately beneath the removable lid. Examples are ice cream used as the base product and toppings such as fruit preserves, puddings or sauces, which may or may not contain more dense materials such as fruit pieces, nuts, and the like. In these instances the contents of the container are frozen while the container is in the inverted position, and the contents are maintained in the frozen state during subsequent shipment, storage and marketing.

The method also facilitates filling containers with a base food product that does not necessarily get-set, but has sufficient viscosity or cohesive strength, or is sufficiently solidified that it can support a topping at least partially including food materials having greater specific gravity than the specific gravity of the base material. Examples are a base food product of cottage cheese or ricotta cheese and toppings of fruit preserves that may include individual fruit pieces.

The present method also facilitates commercially filling container with base food products having top layers of a sauce-type food material. In these instances the sauce-type material is introduced to the container as a liquid to form a uniform layer on the inside surface of the lid. The base material is then added to fill the inverted container. The contents of the container are frozen while the container is in its inverted position to solidify the contents. The container is filled sufficiently with the base food product so that in its frozen form, it can self-support the solidified sauce-type layer above it and maintain it in contact with the inside surface of the lid after the container is re-inverted to the upright position. Examples of such food products include spaghetti with a spaghetti sauce top layer, and oriental foods, such as oriental vegetables with an oriental sauce-type topping.

The method facilitates filling containers with food products so that the top layer can be maintained against the underside of a transparent lid or see-through window during prolonged storage in the right-side-up position. Thus, the contents constantly have an attractive appearance when the container is oriented in the right-side-up position. Any tendency of the top layer to separate and produce a "head space" between the topping and the inside surface of the lid can otherwise substantially reduce the visual attractiveness of the product. Such an entrapped air space also can result in discoloration or off-flavors of the food product exposed to the air space. In the present method, when the topping material is introduced to the container, it displaces air initially present in the portion of the container occupied by the topping material. The remainder of the container volume is then filled with the base food product. The base food product maintains the topping in constant contact with the undersurface of the lid, even when the container is re-inverted.

In addition, a partial vacuum can be produced between the topping and the inside surface of the lid. The partial vacuum can, in certain instances, resist any tendency of the contents to sink in the container and, in effect, adhere the contents to the underside of the container top. Examples of food products reduced to practice have shown that even with a small air space at the bottom of the right-side-up container, the contents do not sink to the bottom of the container, but the partial vacuum holds the top layer against the inside surface of the lid. The top layer can be maintained in contact with the inside surface of a transparent lid for a prolonged storage period.

It is important to provide conditions which ensure that the top layer will be maintained in contact with the undersurface of the lid. This can be achieved, in part, by ensuring a complete seal between the lid and the top of the container, i.e., to avoid leakage of air into the top of the container. In some instances the walls of a conical-shaped cup, i.e., a cup which tapers wider toward the lid, provides a component of force in the upward direction that assists in maintaining the top layer in contact with the lid. FIG. 2 illustrates use of the method with a cylindrical cup 56, i.e., one that does not have a tapered outer wall. In many instances such a cylindrical container can be used and still maintain a top layer 28 in prolonged contact with the undersurface of the lid. The cylindrical cup is useful for containing base food products with a more rigid gel set, or ability to self-support the top layer, where the wall of the container is not required to assist in providing a component of upward force to maintain the top layer in contact with the lid.

EXAMPLES

Containers were filled with a number of composite food items, comprising a base food product and a topping, according to the techniques described above. In the following examples, the containers were sealed with an entirely transparent lid.

In a first group of food items, the base component was a fruit-flavored gelatin. A closed, empty container was inverted and positioned with the bottom opening foremost. In a first example, the inverted container was initially partially filled through the opening with a topping component of fruit cocktail, i.e., pieces of fruit in a heavy syrup, formed as a uniform layer on the inside surface of the lid. The remainder of the inverted container was filled with lime flavored gelatin. In a second example, the topping component was fruit cocktail with pieces of cinnamon candy, and the base component was orange flavored gelatin. In similar third and fourth examples, the topping component was glaced fruit pieces and the base components were lime and orange flavored gelatin. In a fifth example, the topping component was orange marmalade with walnuts and glaced fruit pieces added, and the base component was lime flavored gelatin. In each of these examples the gelatin, in liquid form and at room temperature, was poured into the container and allowed to gel set by refrigeration with the container in the inverted position. The fruit cocktail and preserves remained as a generally uniform continuous layer on the underside of the lid and were not diluted or their continuity otherwise disrupted by the gelatin. Following refrigeration, the containers were reinverted to their upright position. The gel strength of the gel set was sufficient to maintain the top layer in constant contact with the undersurface of the transparent lid for a prolonged storage period.

In a second group of food items, the base component was pudding. In one example, the inverted container was partially filled through the opening with a topping material comprising instant chocolate pudding. The remainder of the container was filled with a base component of instant vanilla pudding. In another example, the top layer comprised a combination of maraschino cherries and nuts with a base of instant butter pecan pudding. In both examples, the pudding was gel-set without refrigeration with the container in the inverted position standing at room temperature, although in some instances a sufficient gel set is established either while the container is in a right-side-up position, or with refrigeration in the inverted position.

In a third group of food items, cheeses were used as the base component. In one example, the topping component was a layer of peach preserves with maraschino cherries, and the base component was cottage cheese. In another example, the topping component was a layer of peach preserves with maraschino cherries, and the base component was ricotta cheese. The cheeses have a sufficient cohesive strength to maintain the more dense solid fruit pieces in constant contact with the underside of the lid, when the container is re-inverted to the upright position.

In a fourth group of food items, the base component was ice cream. In one example, the topping component was a layer of chocolate pudding and the base component was vanilla ice cream. In another example, the topping component was a layer of butterscotch pudding with maraschino cherries, and the base component was vanilla ice cream. In each instance, the container was filled with ice cream in liquid form, and the ice cream did not dilute or otherwise disrupt the continuity or uniformity of the topping material. The contents of the container were frozen with the containers in the inverted position. As long as the contents were maintained in the frozen state, the top layer was maintained in reasonably constant contact with the undersurface of the transparent lid.

In a fifth group of food items, the topping component comprised a variety of sauces for providing flavoring for the base component. In one example, a topping component comprising an oriental sauce, i.e., an oriental flavored meat sauce (with pieces of meat added) was formed as a layer on the inside surface of the lid. The remainder of the container was filled with a base component of Chinese vegetables. In another example, the container was filled with a topping component of spaghetti sauce and a base component of spaghetti. In these instances, the sauces were initially introduced to the container in liquid form and the base component was then added to fill the container. The contents of the inverted container were then frozen. As long as the contents were maintained in the frozen state, the top layer remained in contact with the undersurface of the transparent lid when the container was in the upright position the food items were then reheated in a microwave oven, causing the sauce, when reheated, to reliquify and become dispersed throughout the contents of the container.

Thus, a method is provided for commercially filling containers with composite food products comprising a base component that self-supports a topping adjacent the undersurface of a transparent lid. The method facilitates filling containers with toppings having a higher specific gravity than a base product that self-supports the topping. The method also enables containers to be filled so the topping is maintained in direct contact with the undersurface of a transparent lid when the container is in a right-side-up position for a prolonged storage time. This enhances the visual appearance of the product and can inhibit discoloration or off-flavors from otherwise entrapped air beneath the lid.

I claim:

1. A process for filling a container with a base food product and a topping, comprising the steps of:

providing a container having a removable lid which closes one end of the container and having an opening at the opposite end of the container for providing access to the interior of the container, the lid being removable from the exterior of the container to provide access to the interior of the container, the container being inverted so the removable lid is positioned at the bottom of the container with the opening foremost;

introducing a food product through the opening of the inverted container to form a layer of the food product supported on the inside surface of the removable lid;

introducing through the opening of the inverted container a base food product that is different from the food product layer to fill the interior of the inverted container with the base food product above said layer, the food product forming said layer having a higher specific gravity or a specific gravity about the same as the base food product, the base food product being capable of being sufficiently solidified that, upon subsequently positioning the container in an upright position with the lid foremost, the base food product in the bottom of the container self-supports the food product layer as a topping above it;

sealing the opening in the container;

maintaining the container in the inverted position until the base food product is sufficiently solidified to self-support the food product layer; and positioning the sealed container in the upright position for the base food product to self-support the food product layer above it as a topping beneath the removable lid.

2. The process according to claim 1 in which the food product layer overlies the inside of the lid at a sufficient depth to essentially eliminate an air space between the inside of the lid and the food product layer when the container is placed in the upright position.

3. The process according to claim 1 including sealing the opening by heat-sealing a container wall section to the portion of the container that surrounds the opening.

4. The process according to claim 1 in which at least a portion of the food product forming said layer and the base food product are introduced to the container in liquid form; and in which said layer remains undiluted and undisturbed as a separate layer when in contact with the base food product.

5. The process according to claim 1 in which a partial vacuum is formed which adheres the food product layer to the inside surface of the lid when the container is positioned in the upright position.

6. The process according to claim 1 in which the lid has a transparent portion and in which the food product layer is in contact with the transparent portion of the lid.

7. A process for filling containers with a gellable food product and a topping, comprising the steps of:

providing a container having a removable lid which closes one end of the container and having an opening at an opposite end of the container for providing access to the interior of the container, the lid being removable from the exterior of the container to provide access to the interior of the container, the container being inverted so the removable lid is positioned at the bottom of the container and the opening is foremost;

introducing a food product through the opening of the inverted container to form a layer of the food product supported on the inside surface of the removable lid;

introducing through the opening of the inverted container a gellable base food product to fill the interior of the inverted container with the base food product above said layer, the food product forming said layer having a higher specific gravity or a specific gravity about the same as the base food product;

sealing the opening in the container;

maintaining the sealed container in the inverted position until the gellable food product forms a gel set having a sufficient gel strength that, upon subsequently positioning the container in an upright position with the lid foremost, the gel set base food product in the bottom of the container self-supports the food product layer as a topping above it; and positioning the container in the upright position with the lid foremost after the gellable food product gel sets to provide a container wherein the gel set base food product self-supports the food product layer as a topping that is beneath the removable lid of the container.

8. The process according to claim 7 in which the gellable base food product is selected from the group consisting of cheese, pudding and gelatin.

9. The process according to claim 7 in which the food product layer is selected from the group consisting of fruit pieces, fruit preserves, glaced fruit and fruit cocktail.

10. The process according to claim 7 in which the food product layer is selected from the group consisting of sauces, syrups and puddings.

11. The process according to claim 7 in which at least a portion of the lid is transparent.

12. The process according to claim 7 in which the food product layer overlies the inside of the lid at a sufficient depth to essentially eliminate an air space between the inside of the lid and the food product layer when the container is placed in the upright position.

13. The process according to claim 7 including sealing the opening by heat sealing a container wall section to the portion of the container that surrounds the opening.

14. The process according to claim 7 including refrigerating the contents of the inverted container to produce said gel set.

15. The process according to claim 7 in which at least a portion of the food product forming said layer and the base food product are introduced to the container in liquid form; and in which said layer remains undiluted and undisturbed as a separate layer when in contact with the base food product.

16. The process according to claim 7 in which a partial vacuum is formed which adheres the layer to the inside surface of the lid when the container is positioned in the upright position.

17. A process for filling containers with a base food product and a sauce food product topping such that the topping remains as a coherent mass above the food product, comprising the steps of:
providing a container having a removable lid which closes one end of the container and having an opening at the opposite end of the container for providing access to the interior of the container, the lid being removable from the exterior of the container to provide access to the interior of the container, the container being inverted so the removable lid is positioned at the bottom of the container and the opening is foremost;
introducing through the opening of the inverted container a sauce food product topping to form a layer of the sauce food product supported on the inside surface of the removable lid;
introducing through the opening of the inverted container a base food product to fill the interior of the inverted container with the base food product above said layer;
sealing the opening in the container;
maintaining the sealed container in the inverted position while freezing the contents of the container so that, upon subsequently positioning the container in the upright position with the lid foremost, the base food product in the bottom of the container self-supports the food product layer as a coherent mass above it; and
positioning the container in the upright position with the lid foremost and maintaining the contents in said frozen condition to provide a container wherein said base food product self-supports the sauce food product topping layer as a coherent mass that is beneath the removable lid of the container.

18. The process according to claim 17 in which the lid has a transparent window.

19. The process according to claim 17 including sealing the opening by heat-sealing a container wall section to the portion of the container that surrounds the opening.

20. The process according to claim 17 in which a partial vacuum is formed which adheres the layer to the inside surface of the lid when the is positioned in the upright position.

21. A process for filling a container with a base food product and a topping, comprising the steps of:
providing a container having a removable lid which closes one end of the container and having an opening at the opposite end of the container for providing access to the interior of the container, the lid being removable from the exterior of the container to provide access to the interior of the container, the container being inverted so the removable lid is positioned at the bottom of the container and the opening is foremost;
introducing a food product through the opening of the inverted container to form a layer of the food product supported on the inside surface of the removable lid;
introducing through the opening of the inverted container a base food product that is different from the food product layer to fill the interior of the inverted container with the base food product above said layer, the base food product being in contact with the food product layer without commingling with said layer, the base food product being capable of being sufficiently solidified that, upon subsequently positioning the container in an upright position with the lid foremost, the base food product in the bottom of the container self-supports the food product layer as a topping above it;
sealing the opening in the container;
maintaining the container in the inverted position until the base food product is sufficiently solidfied to self-support the food product layer; and
positioning the sealed container in the upright position for the base food product to self-support the food product layer above it as a topping beneath the removable lid.

22. The process according to claim 21 in which the base food product is introduced to the container in liquid form.

23. The process according to claim 22 in which the food product forming said layer is introduced to the container in liquid form.

24. The process according to claim 21 in which a partial vacuum is formed which adheres the food product layer to the inside surface of the lid.

* * * * *